(12) United States Patent
Stevenson et al.

(10) Patent No.: US 11,665,564 B2
(45) Date of Patent: May 30, 2023

(54) SYSTEM AND METHOD FOR GENERATION OF SHARED SIGNAL FREQUENCY MAP FOR FREQUENCY SHARING CHOICE

(71) Applicant: Rurisond, Inc., Redwood City, CA (US)

(72) Inventors: Robert S. Stevenson, Redwood City, CA (US); Tom Riddle, Belmont, CA (US)

(73) Assignee: RURISOND, INC., Redwood City, CA (US)

( * ) Notice: Subject to any disclaimer, the term of this patent is extended or adjusted under 35 U.S.C. 154(b) by 119 days.

(21) Appl. No.: 17/170,448

(22) Filed: Feb. 8, 2021

(65) Prior Publication Data

US 2022/0256370 A1 Aug. 11, 2022

(51) Int. Cl.
*H04W 24/08* (2009.01)

(52) U.S. Cl.
CPC .................................. *H04W 24/08* (2013.01)

(58) Field of Classification Search
CPC ..................................................... H04W 24/08
See application file for complete search history.

(56) References Cited

U.S. PATENT DOCUMENTS

| 7,092,440 | B1 | 8/2006 | Dress et al. |
| 7,333,528 | B1 | 2/2008 | Miao |
| 8,363,696 | B2 | 1/2013 | Trachewsky |
| 8,391,385 | B2 | 3/2013 | Costa |
| 8,780,954 | B2 | 7/2014 | Fujiki |
| 8,831,520 | B2 | 9/2014 | Demessie et al. |
| 9,572,114 | B2 | 2/2017 | Chen |
| 10,211,892 | B2 | 2/2019 | Shattil |
| 10,491,261 | B1 | 11/2019 | Al-Eidan |
| 10,506,555 | B2 | 12/2019 | Stevenson et al. |
| 10,574,497 | B1 | 2/2020 | Shattil |
| 10,820,252 | B2 | 10/2020 | Vajapeyam |
| 11,405,254 | B2 | 8/2022 | Dobson et al. |
| 2005/0227625 | A1 | 10/2005 | Diener |
| 2008/0159434 | A1 | 7/2008 | Park |
| 2008/0232504 | A1 | 9/2008 | Ma |
| 2009/0003201 | A1 | 1/2009 | Horvitz |
| 2009/0022252 | A1 | 1/2009 | Goh |
| 2009/0046625 | A1 | 2/2009 | Diener et al. |

(Continued)

OTHER PUBLICATIONS

Cognitive Radio, Wikipedia, retrieved from: https://en.wikipedia.org/wiki/Cognitive_radio on Aug. 22, 2017, 7 pages.

(Continued)

*Primary Examiner* — Abdeltif Ajid
(74) *Attorney, Agent, or Firm* — Jennifer Hayes; Nixon Peabody LLP (57) ABSTRACT

System and methods are disclosed for collecting detailed list of frequencies along with any relevant information such as users, time of day, weather, ionospheric conditions, quality of the transmission. This information is used to create a detailed frequency map. The frequency map is continuously updated. The frequency map is used to generate an optimum list of frequency bands that can be used for frequency (Continued)

sharing. Having a real-time frequency map allows for fast and reliable switching between optimum frequencies if a primary user is detected during transmission.

61 Claims, 6 Drawing Sheets

(56) References Cited

U.S. PATENT DOCUMENTS

| | | |
|---|---|---|
| 2010/0081449 A1 | 4/2010 | Chaudhri et al. |
| 2010/0110381 A1 | 5/2010 | Manouchehr et al. |
| 2010/0136989 A1 | 6/2010 | Westerberg et al. |
| 2010/0144278 A1* | 6/2010 | VanHarlingen ....... H03J 1/0091 455/67.7 |
| 2010/0287273 A1 | 11/2010 | Nasir |
| 2012/0125772 A1 | 5/2012 | Stetter et al. |
| 2013/0039315 A1 | 2/2013 | Jo et al. |
| 2014/0242981 A1 | 8/2014 | Hassan et al. |
| 2015/0189528 A1 | 7/2015 | Carbajal |
| 2016/0088486 A1 | 3/2016 | Taher et al. |
| 2016/0197756 A1 | 7/2016 | Mestdagh |
| 2018/0110030 A1 | 4/2018 | Stevenson et al. |
| 2020/0021328 A1 | 1/2020 | Haartsen |
| 2020/0145271 A1 | 5/2020 | Bala |
| 2020/0313816 A1 | 10/2020 | Sun |
| 2021/0051048 A1 | 2/2021 | Emstrom |
| 2021/0067397 A1 | 3/2021 | Liston |
| 2021/0389474 A1* | 12/2021 | Hamzeh ............. H04B 7/18517 |
| 2022/0038527 A1* | 2/2022 | Zhong .................... G06F 16/27 |
| 2022/0150100 A1 | 5/2022 | Dobson et al. |

OTHER PUBLICATIONS

Band Sharing in Public Sector Spectrum—Negotiating Rights for Commercial Use, Analysis Mason, White Paper, 4 pages.
Spectrum Database Help, Google, 2016, retrieved from: https://support.google.com/spectrumdatabase/?hl=en on May 6, 2016, 7 pages.
Hassan et al., OFDM Spread Spectrum Communications, Perspectives in Spread Spectrum, The Springer International Series in Engineering and Computer Science (Communications and Information Theory), 1998, vol. 459, Abstract Only.
Kokkeler et al., Synchronization of OFDM at low SNR over an AWGN channel, American Journal of Physics, 2011, pp. 1-10.
Mason et al., Study of NVIS Channel for USN Protocol Definition in Antarctica, Electronics, 2020, vol. 9(1037), pp. 1-21.
Matheson et al., The Technical Basis for Spectrum Rights: Policies to Enhance Market Efficiency, Brookings, 2011, pp. 1-55.
Peha, J.M., Approaches to Spectrum Sharing, Regulatory and Policy Issues, IEEE Communications Magazine, 2005, pp. 10 and 12.
Peha, J.M., How America's Fragmented Approach to Public Safety Wastes Money and Spectrum, 33rd Telecommunications Policy Research Conference, 2005, pp. 1-18.
Tac Radios, Multi-Service Tactics, Techniques and Procedures for Tactical Radios, Army, Marine Corps, Navy, Air Force, 2013, 144 pages.

* cited by examiner

SYSTEM AND METHOD FOR GENERATION OF SHARED SIGNAL FREQUENCY MAP FOR FREQUENCY SHARING CHOICE

BACKGROUND

1. Field

The present disclosure relates to a system and method for frequency sharing and, more specifically, to generating a detailed frequency map that can be used to generate of a list of currently unused and optimal frequency bands.

2. Related Art

As the number of connected devices keeps increasing, the demand for available frequency spectrum will keep increasing. Frequency spectrum sharing or frequency sharing is becoming more important to serve the ever-increasing demand for available spectrum. Frequency sharing is using the same frequency by two or more users (or stations) that are separated geographically or using the same frequency at different times. One of the barriers to frequency sharing is the lack of information—what frequencies are available based on either geography or time of usage. Another issue is that even though a frequency band may be currently unused, it may not be optimal (the frequency band could be noisy), as the communication is affected factors such as distance, environment (terrain), time of day, season, ionospheric conditions etc. This is especially a problem when the communication is with a machine, sensor, data logger, etc. located at a remote location.

In addition, real time detection of currently available frequency bands and then using the optimal frequency bands within the available frequency bands is not efficient. This detection and switching also has latency implications and could potentially make the communication unreliable.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Having a detailed frequency map that allows the selection of currently unused and optimal frequency band(s) for communication will solve the problems described above. Embodiments of the present disclosure are directed to creating a real-time frequency map/database based on updates received from all clusters and used to create a list of unused and optimum frequency bands.

Embodiments are directed to automatically detecting transmission by transmitter(s) external to the system, determining if transmitters are primary or external transmitters. Details of the primary transmitter are communicated within the system. Details of the transmitter are stored in the frequency map (database). Variations of characteristics of each of the transmission channel types and transmission modes may also be collected. Data regarding time of day, season, ionospheric conditions, and other relevant details such as weather may also be collected. Daily and seasonal variations of these transmission modes and frequency channels from any other databases may be determined and also stored.

The collected data is analyzed to make decisions of use transmission mode and frequency channel. The frequency map may be continuously updated with historical, current, and predicted frequency band conditions along with other ancillary data.

The real time frequency map is used to generate a list of optimum and unused frequencies. The lists of optimum and unused frequencies are communicated to base stations (BR) and corresponding endpoints (EP). The system analyzes information and continuously updates the frequency map and communicates updated lists of optimum and unused frequencies.

Embodiments of the present disclosure are also directed to automatically detecting and reporting sub-optimal performance of any frequency band(s), and communicating this information appropriately within the system.

Beacon stations (BES) may be used to continuously characterize spectrum. The frequency map may be used to strategically position the frequency of the beacon signals.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

System and methods are disclosed for collecting detailed list of frequencies along with any relevant information such as users, time of day, weather, ionospheric conditions, quality of the transmission. This information is used to create a detailed frequency map. The frequency map is continuously updated. The frequency map is used to generate an optimum list of frequency bands that can be used for frequency sharing. Having a real-time frequency map allows for fast and reliable switching between optimum frequencies if a primary user is detected during transmission.

Figure 1:
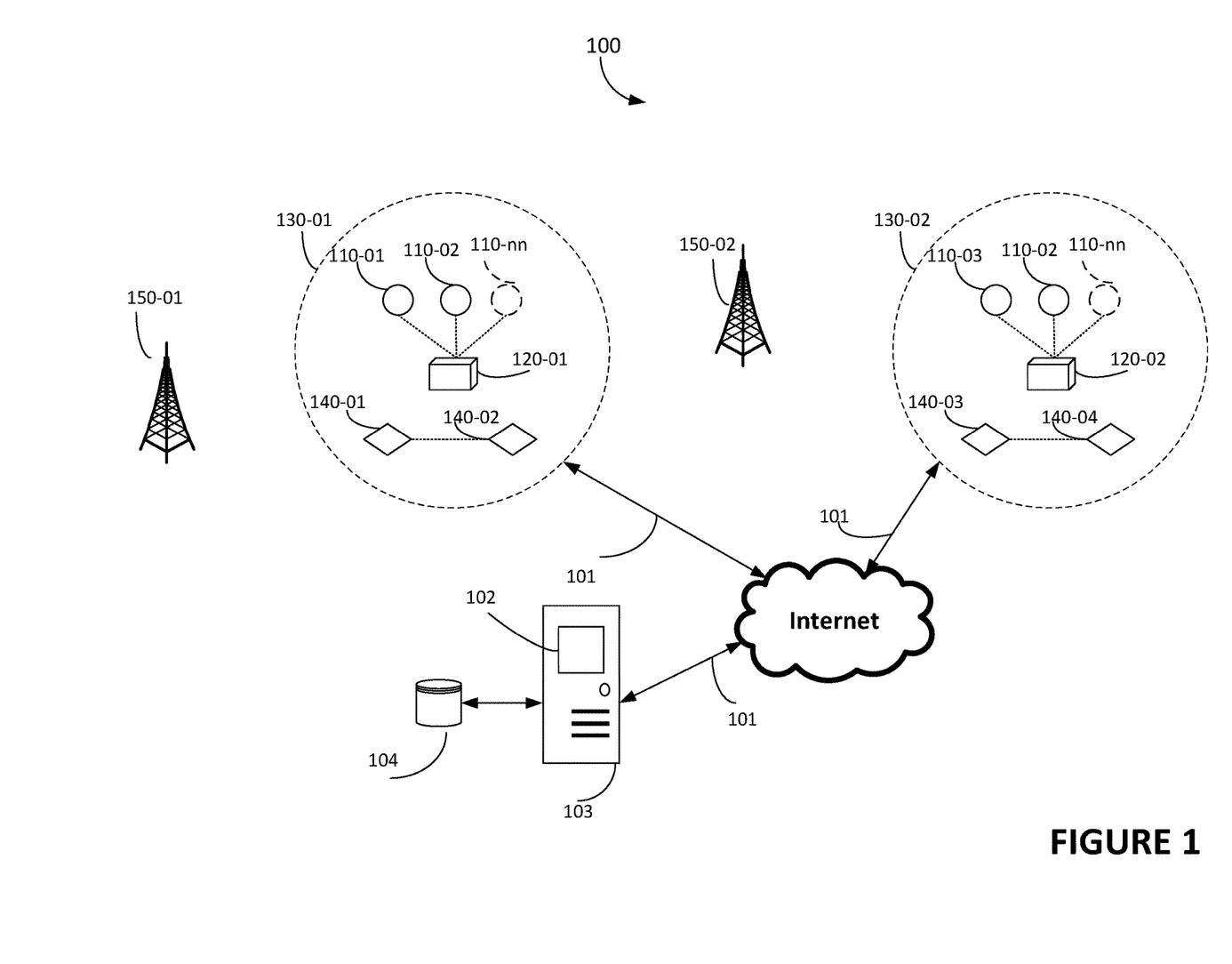
FIG. 1 is a schematic diagram showing a system in accordance with an embodiment of the invention.

FIG. 1 shows an exemplary implementation of a system as per an embodiment of the invention. System 100 shows base station radios (BR) 120-01 and 120-01. Each BR radio 120 has associated endpoint radio (EP) 110 and beacon station 140 (BES). In the figure, only two BR radios 120 are shown, but the system 100 can have any number of BR 120, and associated endpoint radios EP 110, and Beacon stations 140 (BES). The EP 110 and BES 140 associated with each BR 120 are loosely grouped together in clusters 130. Cluster 130 refers to a loose affiliation of Endpoint Radios (EP) 110 and Beacon Stations 140 (BES) surrounding a Base Radio (BR) 120. BR 120 communicates with a server 103 via Internet 101. FIG. 1 does not show physical distances to scale, physical structures, terrain etc.

EP 110 refers to a radio located at an endpoint where a machine, sensor, data logger, etc. is located. Typically, EP 110 is used to control and log data from a sensor etc. so it may be powered and operated intermittently.

Beacon stations (BES) 140 continuously ping other BES 140 to scan the spectrum. BES 140 report to the server 103 details such as frequencies that are open and working, quality of communication using these frequencies. BES 140 also report relevant details such as frequencies that are being used, if the users are primary users or users external to the system 100 and other relevant details such as time, season, weather, ionospheric conditions, etc. In some embodiments, BES 140 are used for efficiency; however, both EP 110 and BR 120 can perform BES 140 functions. In one embodiment, an EP 110 and BES 140 may be associated with more than one BR 120. At any given time, EP 110 is associated with a single BP 120, but, as conditions change, EP 110 can be associated with a different BR 120. Both BES 140 and BR 120 are connected to internet (though not explicitly shown in the figure).

BR 120 and BES 140 are connected to the server 103 via internet 101. BR 120 and BES 140 connect to internet 101 via wired (Ethernet, Fiber etc.) or wireless connections (cellular, satellite etc.). The communication between BR 120, BES 140 and server 103 via Internet 101 can be done using protocols such as TCP/IP (Internet Protocol), UDP etc. Server 103 can be a dedicated centralized server, edge server, distributed server, or a cloud-based server.

Server 103 includes databases 104 to maintain the frequency map, where it updates the frequency information on a continuous basis. In an embodiment of the invention, the frequency map is a distributed frequency map where the BR 120, BES 140, EP 120 and server 103 maintain the frequency map. BR 120 and BES 140 provide information about frequency, frequency users and other relevant details such as time of day, weather, season etc. BR 120 and BES 140 also provide details on the free frequencies and the quality of these frequencies. EP 110 may not have a real time frequency map as they may be operated intermittently. EP 110 may not have a full frequency map to save memory, compute, and power resources in the EP 110 implementation. Server 103 can also communicate with other external databases to gather information regarding location, weather, ionospheric conditions, licensed transmitters, or primary transmitters. Server 103 includes a frequency manger 102, which also communicates with database 104. Frequency manager 102 is a functional module that surveys, monitors, and controls access to specific frequencies in the server.

In one embodiment, the signal used by BES 140 to scan the spectrum (by pinging other BES 140) has information that allows an EP 110 to determine the frequency band(s) to be used to communicate with the BR 120. Server 103 may instruct BER 140 to update this frequency band(s) (used by EP 110) based on analysis. In another embodiment, BR 120 may transmit a beacon signal that will enable EP 110 to determine the frequency band to be used to communicate with BR 120. The beacon signal may be transmitted continuously by BR 120 or may be transmitted periodically (once every 15 s, every 1 hour etc.). Server 103 based on analysis may instruct BR 120 to update the beacon signal frequency, periodicity, and any other relevant details.

FIG. 1 illustrates how the system 100 detects primary transmitters 150-01 and 150-2. The primary transmitters 150-01 and 150-02 do not belong any cluster 130 in the system 100 and are not associated with any BR 120 and are considered external to the system 100. Primary transmitters (or primary users) typically refer to users that are authorized (licensed) to use that particular frequency or frequency bands. In one embodiment, any transmitter 150 external to the system 100 is considered to be a primary transmitter 150. In another embodiment, the system 100 can determine if the external transmitter 150 is an authorized or licensed transmitter that is permitted to transmit at that particular frequency and only considers authorized users to be primary transmitters. System 100 determines if a transmitter 150 is external to the system 100 (i.e., it is not a BR 120, EP 110, or BES 140).

The terms frequency band or frequency channel are used interchangeably in this invention. A frequency band is a list of frequencies that do not have to line up on particular frequency boundaries and so on and the term is used a compact way to refer to the frequency list(s). An optimum frequency is one that has low noise or few errors. Noise here refers to an undesired disturbance to the useful information and is typically measured using SNR (Signal to Noise ratio). A higher signal to noise ratio is more desirable.

The primary transmitter 150-01 is detected by cluster 130-02. Based on the characteristics of the primary transmitter 150-01 and other characteristics, such as terrain, distance, weather, ionospheric conditions, etc., one or more radios (120-02, 110-03, 110-04, 110-nn, 140-03, 140-04) inside the cluster 130-02 detect the primary transmitter 150-02. If an EP (110-04, 110-05, 110-nn) in the cluster 130-02 detects the primary transmitter 150-01, it follows the method 400 shown in FIG. 4, where it updates the details of the transmission in its local database and also updates BR 120-02. BR 120-02 follows the method 500 shown in FIG. 5 and updates the server 103. Server 103 follows the method 300 shown in FIG. 3. In this case, server 103 analyzes the details and updates the frequency map and stores the details of the primary transmitter 150-02 along with relevant details of the transmission such as frequency band, duration of the transmission, duty cycle (transmission on/off periods), quality etc. Further, publicly available published data of daily and seasonal data may be collected, and variations of the transmission modes and frequency channels may be determined are stored by the server 103. The data collected by system 100 and from external sources are analyzed by the server 103. In this case, server 103 determines that no other clusters 130 besides 130-02 are affected. After analysis, it appropriately communicates an update list of optimum frequencies to BR 120-02, which then updates other EP 110 and BES 140 inside cluster 130-02.

Figure 5:
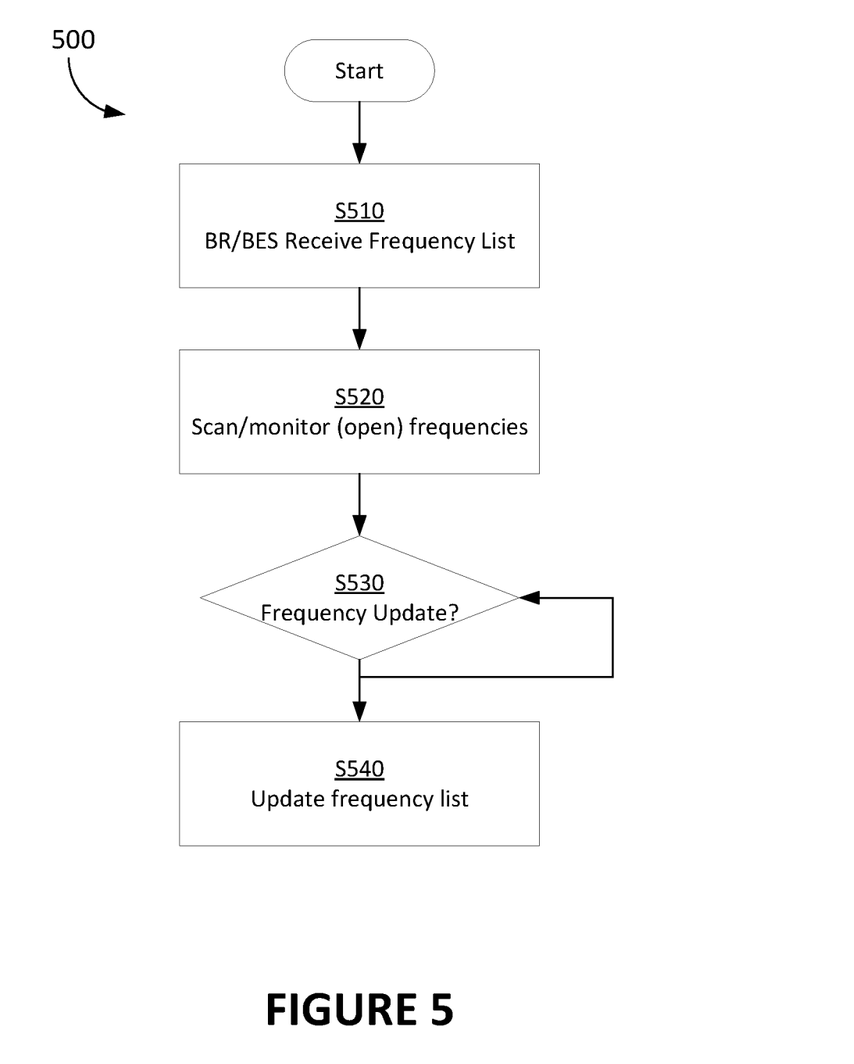
FIG. 5 is a flowchart showing a method used at a base station radio or beacon station in accordance with an embodiment of the invention.

Primary transmitter 150-02 is detected by cluster 130-01. As described in the previous section, the EP 110 inside cluster 130-01 follow the method 400 and updates server 103 via BR 120-02. BR 120-02 follows the method 500 and server 103 follows method 300. After analysis, server 103 determines that primary transmitter 150-02 could potentially affect the operation of the radio stations inside cluster 103-01 and 103-02. So, in this case server 103 updates the optimum frequencies to cluster 130-01 and also to cluster 130-02. BRs 120-01 and 120-02 follow the appropriate steps in method 500 as shown in FIG. 5.

Figure 2:
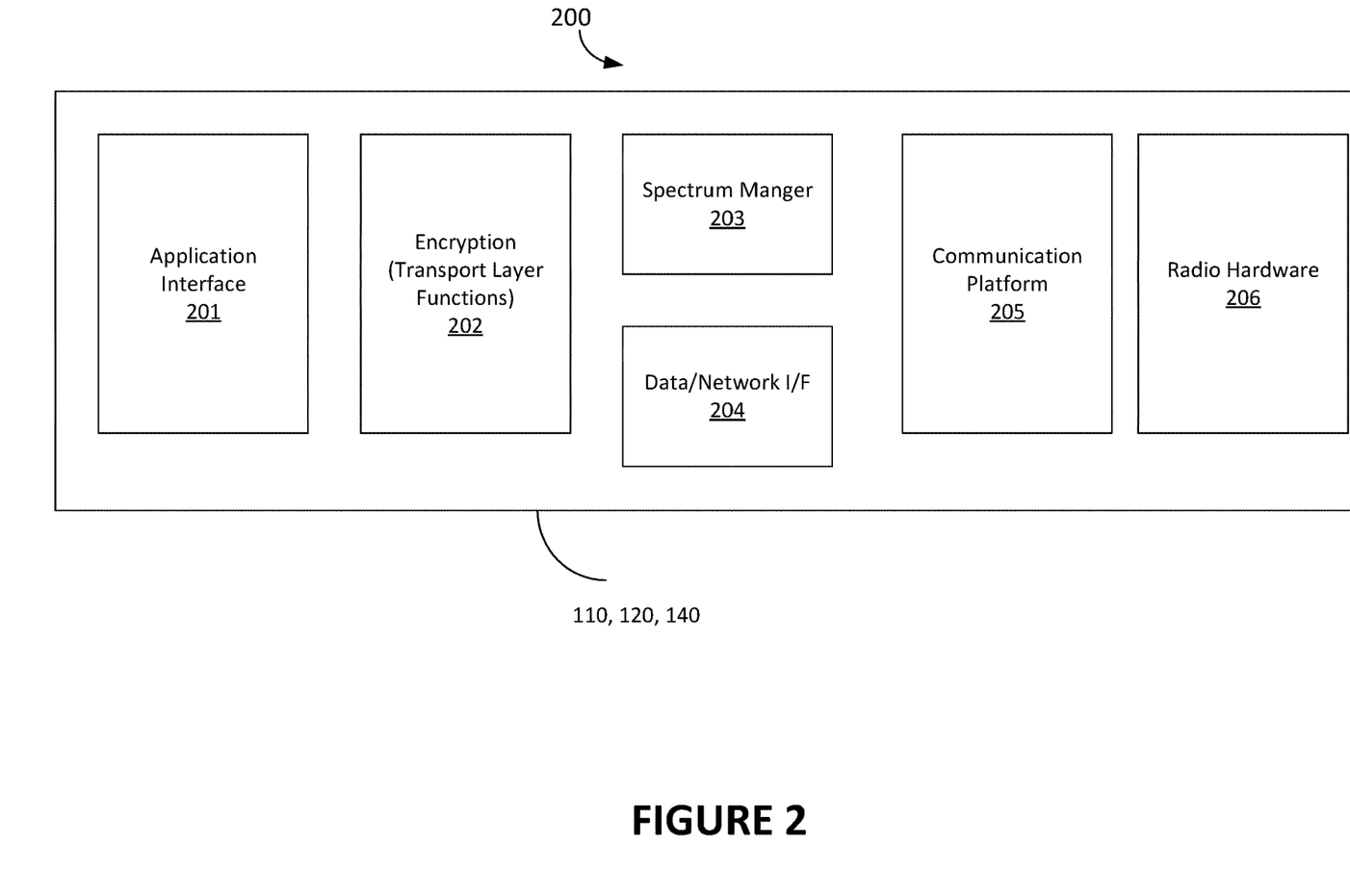
FIG. 2 is a block diagram showing an exemplary BR (Base Station Radio), EP (Endpoint Radio), or BES (Beacon Stations) in accordance with an embodiment of the invention.

FIG. 2 shows an exemplary implementation of BR 120, BES 140, or EP 110. In this example. the EP, BES and BR are identical. Typically, BR connects to many EPs 110. An EP 110 can do duty as a BP 120. However, BR 120 typically has more capacity—more memory, bigger processor, bigger antennas, more bandwidth processing capability, etc. A critical distinction between the EP 110 and BR 120 is that BR 120 can communicate with server 103. EP 110 are designed to be more power efficient. As discussed earlier, BES 140 are used for efficiency and may have all the functionality included in the EP 110 or BR 120. As BES 140 are always scanning the spectrum, they may be designed to operate in a more power efficient manner when compared to BR 120. Just like BR 120, BES 140 can communicate with the server 103. The functionality of EP 110, BES 140, or BR 120 can be implemented using processors, software instructions stored in memory and radio hardware using discrete components (such as processors, DSP (Digital Signal Processor) and memory), SoCs (System-on-Chip), Field Programmable Gate Arrays (FPGAs), ASICs (Application Specific Integrated Circuit) or a combination of these.

The following discussion focuses on the implementation of BR 120 and EP 110 and the details are applicable to BES 140. External communication with BR 120/EP 110 is achieved via an application interface 201. In the case of BR 120, application interface 201 is used for external control and communication with the server 103 using protocols such as IP (Internet Protocol), UDP. In the case of EP 110, the application interface 201 is used to communicate with devices such as data loggers, sensors etc. and can support a number of standard interfaces including wired interfaces and wireless interfaces (Serial, Ethernet, USB, I2C, SPI, ZigBee etc.). Application interface 201 in BES 140 primarily focuses on communicating with server 103.

Encryption module 202 handles the encryption of data being transferred. Encryption module 202 also handles all other transport layer function such as Segmentation and Reassembly, Connection Control, Error Control, and flow control.

Spectrum manager 203 is used to scan the operating spectrum for primary transmitters 150 on a continuous basis. In one embodiment, BES 140 is always scanning the spectrum for primary transmitters 150. The raw spectrum data obtained is used for detailed signal identification, update the spectrum conditions and historical trends. Spectrum manager 203 maintains a local list of open and optimum frequencies and selects the final operating frequency bands. Spectrum manager 203 maintains a communication handshake with the server 103, more specifically a frequency manager in the server 103. As discussed above, frequency manager 102 refers to a functional module that surveys, monitors, and controls access to specific frequencies in the server. The frequency manager 102 provides a list of optimum and open frequencies that can be used for communication within the clusters 130. The frequency manager 102 is where the frequency map is built and maintained in real time. The detailed analysis and building of the frequency map may done wholly by the server 103. In another embodiment, the analysis and building of the frequency map may be done in a distributed fashion, where the tasks are shared between the BES 140, BR 120, and server 103. The real time updates to the frequency map may also done in a distributed manner.

A Data/Network Interface 204 manages and maintains the data connections. Data/Network Interface 204 includes functions such as "primary transmitter detect and move," "listen before transmission," etc. The Data/Network interface listens for other users in the frequency bands before transmits. During transmission, if it detects another primary transmitter, it will stop the transmission on the current frequency band and move to a different frequency band. Data/Network Interface 204 determines the frequencies within the selected operating band for data transfer.

Communication platform 205 along with radio hardware 206 handles the physical point-to-point connection over the open RF spectrum and includes functions such as modulation/waveforms, constellation mapping, transmit power control and antenna control.

The Data/Network Interface 204, communication platform 205 and radio hardware 206 also interact with the frequency manager within the server 103. For instance, during a data transmission if the number of errors detected exceeds a predefined threshold—this information is communicated to the frequency manager. Frequency manager analyzes this information along with the spectrum conditions and provides appropriate updates (frequency bands) back to the BR 120/EP 120. It also will update the frequency map and the optimum frequency list. The optimum frequency list is a list of frequencies that has high SNR or does not have a number of errors exceeding a predefined threshold. Typically, the error threshold is application dependent.

Figure 3:
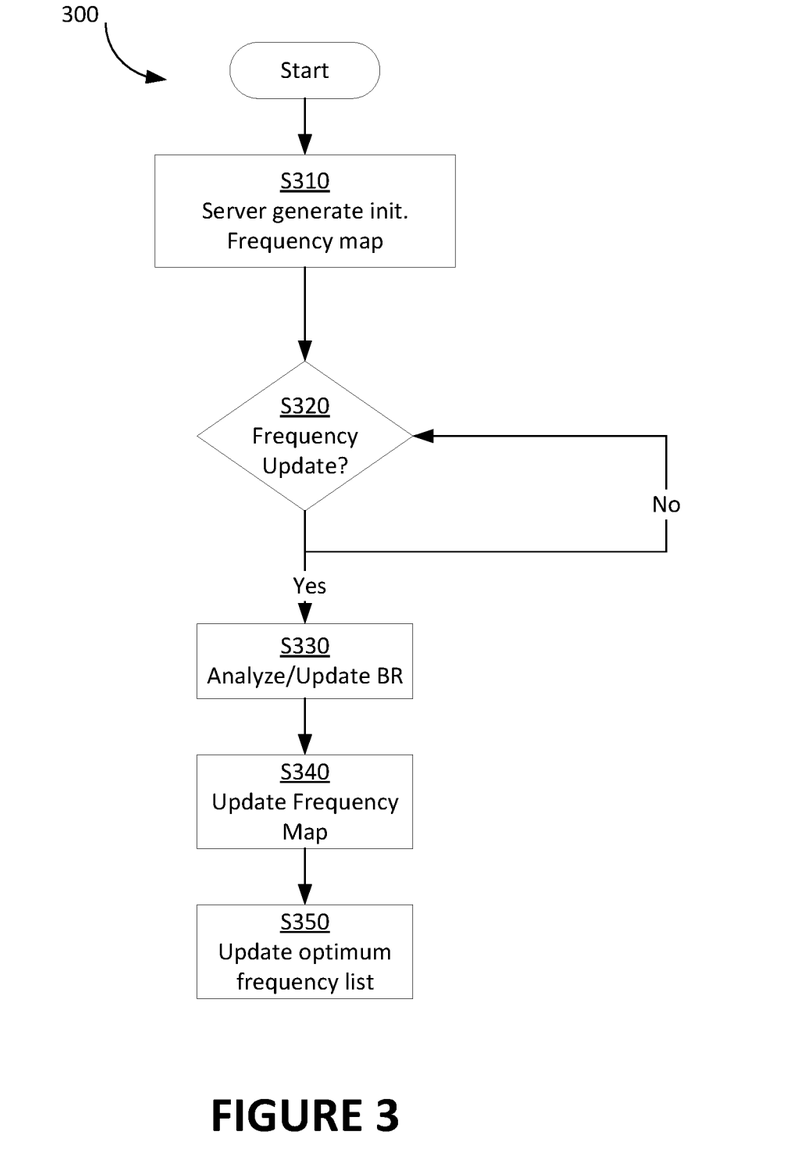
FIG. 3 is a flowchart showing a method used at a server in accordance with an embodiment of the invention.

FIG. 3 shows an exemplary flowchart of method 300 used in the server 103. This method comprises a number of steps that are not necessarily performed in sequence. It will be appreciated that the method may also include fewer or additional steps.

The method beings with the server generating the initial frequency map (S310). Server 103 populates the initial frequency map with data regarding clusters 130 and corresponding BR 120, BES 140 and EP 110. Examples of the initial data are: locations of EP 110, BES 140, and BR 120, duty cycles (transmission on and transmission off periods) of the various EP 110. The location data gathered can be used by the server 103 to gather a list of known primary transmitters 150 by querying either its historical records (in database 104) or querying other online databases or data sources. Server 103 can also establish policies on how to gather weather or ionospheric condition-related information based on the locations gathered. The duty cycle information gathered is used to setup communication policies with various BR 120 and correspondingly with EP 110. Based on the frequency map thus populated, server 103 can communicate a list of open and optimum frequencies to the various clusters 130. Server 103 creates a detailed regional and national frequency map.

The method continues with a frequency update? (S320). Server 103 receives information about a detection of a transmission at a new frequency by a transmitter external to the system. It could also receive updates about the frequency map established. Examples include: sub-optimal performance in a particular frequency band used for communication within a cluster 130, changes in the transmission behavior of already know primary transmitter 150, and information from an external database or source about a new primary transmitter 150. Server 103 can also request a scan for an external transmitter 150 in a frequency band. Server can request a particular BES 140 to perform the scan, a subset of BES 140, EP 110, or BR 120 to perform the scan or request all clusters 130 to perform this frequency scan. Server 103 can receive this frequency update from BES 140, BR 120, or EP 110. The method 300 continuously monitors for any frequency updates and will remain in S320 until a frequency update is detected.

The method continues with analyze/update BR (S330): Server 103 analyzes the data received in the previous step (S320). In addition to the data collected by the system 100 regarding frequency bands and channels, data on variation of characteristics of each of the transmission channel types and transmission modes are also collected. Further publicly available published data of daily and seasonal variations of these transmission modes and frequency channels are combined with the collected data to make decisions on frequency channels. For example, server 103 analyzes the new frequency update (S320) to determine if the frequency transmission is by a primary transmitter 150. Server 103 may analyze the sub-optimal (errors during data transmission) performance to determine the root-cause and suggest appropriate solutions to fix sub-optimal performance. It may query weather databases and other online databases/data sources to gather information. Server 103 may optionally update affect BR(s) 120 or clusters 130 and will iterate to ensure performance issues are fixed. BES 140 are always scanning the spectrum for primary transmitters 150 and also are providing updated information regarding channel conditions. Based on this information, server 130 is continuously analyzing this information.

The method continues to update the frequency map (S340). Server 103 updates the frequency map with the analysis (S330) and also updates the frequency map with other ancillary data such as weather, time, season, etc. The frequency map is continuously updated. This real time data is used to continuously update the stored historic data. The frequency map along with the map of band conditions including historical, current, and predicted are stored. The server 103 continuously updates the frequency map based on the data provided by BES 140.

The method continues to update the optimum frequency list (S350). The updated frequency map (S340) is used to create or update a list of optimum frequencies and the server 103 communicates this updated list to all clusters 130. The server 103 may instruct BR 120 to update the beacon signal. Server 130 may also instruct BER 140 to update the information included in the ping signal used by BER 140. The information in the ping signal is used by EP 110 to communicate with the BR 120.

Figure 4:
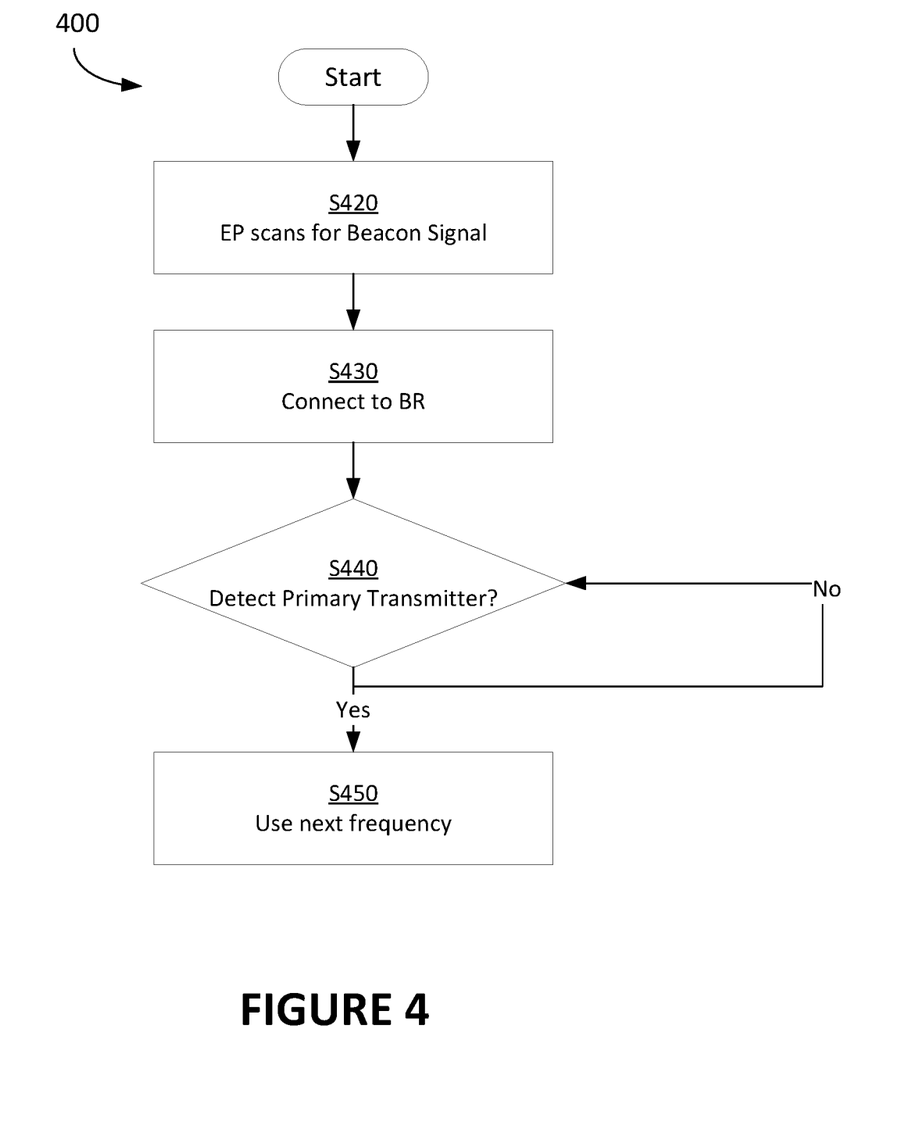
FIG. 4 is a flowchart showing a method used at an endpoint in accordance with an embodiment of the invention.

FIG. 4 shows an exemplary flowchart of the method 400 used in the EP 110. This method comprises a number of steps that are not necessarily performed in sequence. It will be appreciated that the method may also include fewer or additional steps.

Method 400 shows how an EP110 communicates with BR 120. EP 110 first determines what frequency bands to use to communicate with a BR120, it then connects to the BR and may receive an updated list of frequency bands. During communication with BR 120 it may detect that the frequency bands used to communicate are also being used a primary or external transmitter (150). This may be detected by actively listening to its transmission. EP 110 may also segment the data to be transmitted into chunks and will "listen to transmitters 150" before transmitting of each chunk. If no other transmitter 150 are found it will complete the current transmission and may optionally power down. If a transmitter 150 is found it could automatically to move a new frequency band and complete the current transfer. The method beings with EP scanning for a beacon signal (S420). Before EP 110 begins transmission, it looks for beacon signal. The beacon signal is transmitted by BR 120. If a beacon signal is detected, it learns what frequency bands to use to communicate with BR 120. In another embodiment, EP 110 may try to scan the spectrum to detect the ping signal used by BER 140. The ping signal used by BER 140 provides information on what frequency bands to use to communicate to BR 120. Alternately, it can use algorithms which consider last connection(s), history (time of day, season, weather), list of open frequencies (previously communicated by BR 120). Scanning a beacon signal to establish communication with BR 120 is the preferred implementation as this quickest.

The method continues to connect to BR (S430): EP 110 connects to BR 120. Before transmission, EP 110 listens to any transmitters before transmission. After connecting with BR 120, EP 110 receives an updated frequency band(s) to use for communication.

The method continues to detect a primary transmitter (S440). EP 110 detects a new primary transmitter 150 and moves to S450. If no transmitter 150 is detected, EP 110 will finish the current transmission and may optionally power down until it is ready for a new transmission.

The method continues by using next frequency (S450). If EP 110 detects a new primary transmitter in step S440, EP moves to the next frequency in its frequency band (received previously in S410). EP 110 updates the BR 120 of the new primary transmitter, then BR 120 updates the server 103 with this information.

FIG. 5 shows an exemplary flowchart of the method 500 used in the BR 120 or BES 140. This method comprises a number of steps that are not necessarily performed in sequence. It will be appreciated that the method may also include fewer or additional steps.

The method begins with BRIBES receiving a frequency list (S510). The method 500 for BR 120 and BES 140 starts in this block. BR 120 receives information from server 103. BR 120 uses this information to identify all EP 110 inside its cluster 130 and establishes a communication link with them. BR 120 will load its local frequency database and may optionally update frequency database based on initial instructions received from server 103, or other information from BES 140, or any EP 110 inside its cluster 130. BES 140 updates its local databases with list of frequency bands, associated users, duty cycles, etc. In addition to the optimum frequency list, server 103 also provides beacon signal information to BR 120 and ping signal information to BER 140.

The method continues to scan/monitor (open) frequencies (S520). BR 120 or BES 140 detects a transmission by an external transmitter or sub-optimal performance while transmitting in a particular frequency band. within various nodes of its cluster 130. BES 140 will also be continuously scanning for all open frequencies.

The method continues with a frequency update (S530). BR 120 or BES 140 detects a new transmitter 150 or sub-optimal performance (when transmitting in a particular band). The new transmitter 150 may have been detected by EP 110 in the cluster 130.

The method continues to update the frequency list (S540). BR 120 updates its local database, it also updates all EP 110 in its cluster. BR 120 sends details on the frequency update to server 103. Server 103 will follow method 300 as previously discussed and update BER 140 and BS 120.

Figure 6:
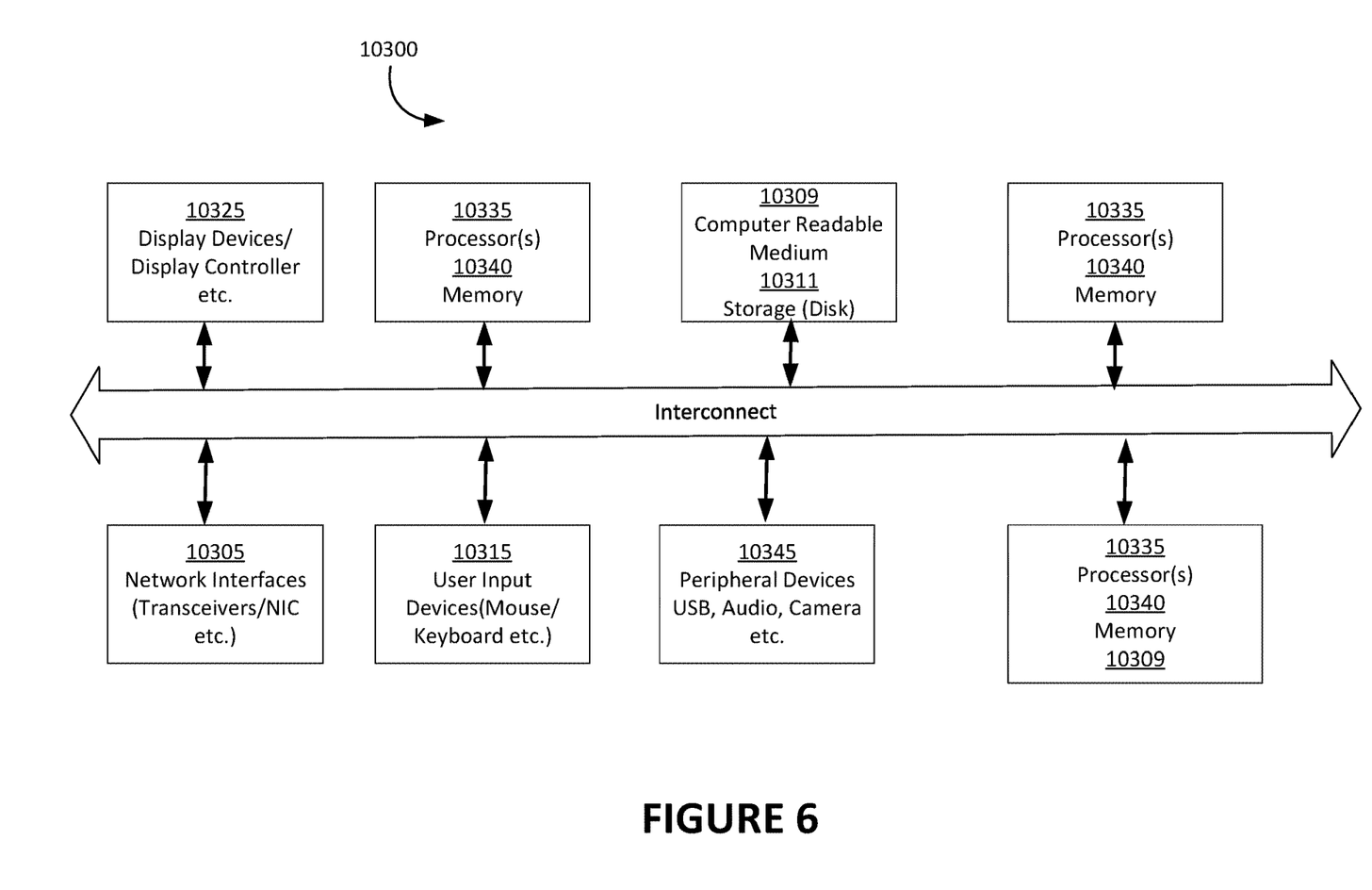
FIG. 6 is a block diagram of an exemplary server in accordance with an embodiment of the invention.

FIG. 6 shows an example of server 103 (referred to as server 10300) shown in system 100 of FIG. 1. Referring to FIG. 6, server 10300 can include one or more processors (10335), memories (10340), storage devices (10311), computer readable medium (10309), network interfaces (10305) and other peripherals (10315, 10345 etc.). The network interfaces may include a transceiver, NIC, etc. The peripherals may include user input devices 10315 such as a mouse, keyboard, etc. or other peripheral devices 10345 such as a USB connector, an audio device, a camera, etc. The storage devices 10311 may include hard disks. The computer readable medium 10309 may include CDs, tape drives, etc. The server may also include a display device/controller (10325). FIG. 6 illustrates a generic server, the server can be implemented as a cloud server, edge server, distributed server, or combination. One or more of the methodologies or functions described herein may be embodied in a computer-readable medium 10309 on which is stored one or more sets of instructions (e.g., software). The software may reside, completely or at least partially, within the memory 10340 and/or within the processor 10335 during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the invention. The term "computer-readable medium" shall accordingly be taken to include, but not be limited to, solid-state memories, and optical and magnetic media.

Embodiments of the invention have been described through processes or flow diagrams at times, which are defined by executable instructions recorded on computer readable media which cause a computer, microprocessors or chipsets to perform method steps when executed. The process steps have been segregated for the sake of clarity. However, it should be understood that the steps need not correspond to discreet blocks of code and the described steps can be carried out by the execution of various code portions stored on various media and executed at various times.

Although a number of possible implementations have been described, these are presented merely for the sake of explanation and teaching, and are not limiting. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method comprising:
generating a frequency map by a server using data from clusters of base station radios, end point radios and beacon stations;
receiving information about a detection of a transmission at a frequency by an external transmitter;
analyzing the received information;
automatically detecting sub-optimal performance of a frequency band;
updating the frequency map based on the analyzing of the received information; and
generating an optimum frequency list using the updated frequency map.

2. The method of claim 1, wherein the frequency map is a real-time frequency map.

3. The method of claim 1, further comprising:
communicating the optimum frequency list to the clusters.

4. The method of claim 1, wherein the detection of the transmission is the detection of a transmission of an external primary transmitter.

5. The method of claim 1, wherein the transmission by the external transmitter is automatically detected.

6. The method of claim 1, wherein information about the external transmitter are stored in the frequency map.

7. The method of claim 1, wherein information about the external transmitter is communicated to the cluster.

8. The method of claim 1, further comprising:
collecting characteristics of each transmission channel type and mode.

9. The method of claim 1, further comprising:
collecting one or more of time of day, day, season, and weather.

10. The method of claim 1, wherein analyzing the data comprises making decisions of a transmission mode and frequency channel to use.

11. The method of claim 1, further comprising:
updating the frequency map with historical, current and predicted frequency band conditions.

12. The method of claim 1, wherein generating the optimum frequency list further comprises generating a list of unused frequencies.

13. The method of claim 1, further comprising:
using the frequency map to position a frequency of the beacon signals.

14. The method of claim 1, wherein the frequency map is a regional frequency map.

15. The method of claim 1, wherein the frequency map is a national frequency map.

16. A system comprising:
a server in communication with a cluster comprising base station radios, end point radios and beacon stations, wherein the server comprises computer-readable media that when executed is configured to:
generating a frequency map by a server using data from the cluster of base station radios, end point radios and beacon stations;
receiving information about a detection of a transmission at a frequency by an external transmitter;
analyzing the received information;
automatically detecting sub-optimal performance of a frequency band;
updating the frequency map based on the analyzing of the received information; and
generating an updated optimum frequency list using the updated frequency map.

17. The system of claim 16, wherein the frequency map is a real-time frequency map.

18. The system of claim 16, further comprising:
communicating the optimum frequency list to the clusters.

19. The system of claim 16, wherein the detection of the transmission is the detection of a transmission of an external primary transmitter.

20. The system of claim 16, wherein the transmission by the external transmitter is automatically detected.

21. The system of claim 16, wherein information about the external transmitter are stored in the frequency map.

22. The system of claim 16, wherein information about the external transmitter is communicated to the cluster.

23. The system of claim 16, further comprising:
collecting characteristics of each transmission channel type and mode.

24. The system of claim 16, further comprising:
collecting one or more of time of day, day, season, and weather.

25. The system of claim 16, wherein analyzing the data comprises making decisions of a transmission mode and frequency channel to use.

26. The system of claim 16, further comprising:
updating the frequency map with historical, current and predicted frequency band conditions.

27. The system of claim 16, wherein generating the updated optimum frequency list further comprises generating a list of unused frequencies.

28. The system of claim 16, further comprising:
using the frequency map to position a frequency of the beacon signals.

29. The system of claim 16, wherein the frequency map is a regional frequency map.

30. The system of claim 16, wherein the frequency map is a national frequency map.

31. A method comprising:
generating a frequency map by a server using data from clusters of base station radios, end point radios and beacon stations;
receiving information about a detection of a transmission at a frequency by an external transmitter;
analyzing the received information;
updating the frequency map based on the analyzing of the received information; and
generating an updated optimum frequency list using the updated frequency map, wherein generating the updated optimum frequency list further comprises generating a list of unused frequencies.

32. The method of claim 31, wherein the frequency map is a real-time frequency map.

33. The method of claim 31, further comprising:
communicating the optimum frequency list to the clusters.

34. The method of claim 31, wherein the detection of the transmission is the detection of a transmission of an external primary transmitter.

35. The method of claim 31, wherein the transmission by the external transmitter is automatically detected.

36. The method of claim 31, wherein information about the external transmitter are stored in the frequency map.

37. The method of claim 31, wherein information about the external transmitter is communicated to the cluster.

38. The method of claim 31, further comprising:
collecting characteristics of each transmission channel type and mode.

39. The method of claim 31, further comprising:
collecting one or more of time of day, day, season, and weather.

40. The method of claim 31, wherein analyzing the data comprises making decisions of a transmission mode and frequency channel to use.

41. The method of claim 31, further comprising:
updating the frequency map with historical, current and predicted frequency band conditions.

42. The method of claim 31, further comprising:
automatically detecting sub-optimal performance of a frequency band.

43. The method of claim 31, further comprising:
using the frequency map to position a frequency of the beacon signals.

44. The method of claim 31, wherein the frequency map is a regional frequency map.

45. The method of claim 31, wherein the frequency map is a national frequency map.

46. A system comprising:
a server in communication with a cluster comprising base station radios, end point radios and beacon stations, wherein the server comprises computer-readable media that when executed is configured to:
generating a frequency map by a server using data from the cluster of base station radios, end point radios and beacon stations;

receiving information about a detection of a transmission at a frequency by an external transmitter;

analyzing the received information;

updating the frequency map based on the analyzing of the received information; and generating an updated frequency list using the updated frequency map, wherein generating the list of optimum frequencies further comprises generating a list of unused frequencies.

47. The system of claim 46, wherein the frequency map is a real-time frequency map.

48. The system of claim 46, further comprising:
communicating the optimum frequency list to the clusters.

49. The system of claim 46, wherein the detection of the transmission is the detection of a transmission of an external primary transmitter.

50. The system of claim 46, wherein the transmission by the external transmitter is automatically detected.

51. The system of claim 46, wherein information about the external transmitter are stored in the frequency map.

52. The system of claim 46, wherein information about the external transmitter is communicated to the cluster.

53. The system of claim 46, further comprising:
collecting characteristics of each transmission channel type and mode.

54. The system of claim 46, further comprising:
collecting one or more of time of day, day, season, and weather.

55. The system of claim 46, wherein analyzing the data comprises making decisions of a transmission mode and frequency channel to use.

56. The system of claim 46, further comprising:
updating the frequency map with historical, current and predicted frequency band conditions.

57. The system of claim 46, further comprising:
automatically detecting sub-optimal performance of a frequency band.

58. The system of claim 46, wherein generating the list of optimum frequencies further comprises generating a list of unused frequencies.

59. The system of claim 46, further comprising:
using the frequency map to position a frequency of the beacon signals.

60. The system of claim 46, wherein the frequency map is a regional frequency map.

61. The system of claim 46, wherein the frequency map is a national frequency map.

* * * * *